(12) United States Patent
Dahlen (10) Patent No.: US 7,965,007 B2
(45) Date of Patent: Jun. 21, 2011

(54) THREE DIMENSIONAL MOTOR GENERATOR SYSTEM

(76) Inventor: Herbert Carey Dahlen, Medford, OR (US)

( * ) Notice: Subject to any disclaimer, the term of this patent is extended or adjusted under 35 U.S.C. 154(b) by 201 days.

(21) Appl. No.: 12/504,309

(22) Filed: Jul. 16, 2009

(65) Prior Publication Data

US 2010/0201217 A1 Aug. 12, 2010

Related U.S. Application Data

(60) Provisional application No. 61/175,504, filed on May 5, 2009.

(51) Int. Cl.
*H02K 7/20* (2006.01)
*H02K 7/00* (2006.01)
*H02K 17/44* (2006.01)
*H02K 19/38* (2006.01)
*H02K 47/00* (2006.01)

(52) U.S. Cl. .......... 310/112; 310/66; 310/113; 310/114; 322/86; 415/916

(58) Field of Classification Search ............... 310/66, 310/112, 113, 114; 322/86; 415/916; 29/596; H02K 7/20, 17/44, 19/38, 47/00
See application file for complete search history.

(56) References Cited

U.S. PATENT DOCUMENTS

| | | | |
|---|---|---|---|
| 538,345 A | | 4/1895 | Porter |
| 1,758,965 A | | 12/1930 | Major |
| 2,463,349 A | * | 3/1949 | Baner .......................... 310/112 |
| 2,782,328 A | * | 2/1957 | Lindberg ..................... 310/112 |
| 3,360,667 A | * | 12/1967 | Gordon, Jr. .................. 310/114 |
| 3,723,796 A | | 3/1973 | Mason |
| 4,274,023 A | * | 6/1981 | Lamprey ........................ 310/83 |
| 4,691,119 A | | 9/1987 | McCabria |
| 5,534,737 A | * | 7/1996 | Nishimura ..................... 310/112 |
| 5,684,351 A | * | 11/1997 | Elferich ........................ 310/112 |
| 5,712,519 A | * | 1/1998 | Lamb .............................. 310/95 |
| 6,118,194 A | * | 9/2000 | Kawamura .................. 310/75 R |
| 6,304,002 B1 | | 10/2001 | Dehlsen et al. |
| 7,338,266 B2 | * | 3/2008 | Miyashita et al. ......... 418/201.3 |
| 7,902,708 B2 | * | 3/2011 | Elmaleh .................. 310/156.43 |
| 2002/0172599 A1 | * | 11/2002 | Ojima et al. ............... 417/44.11 |
| 2002/0185928 A1 | * | 12/2002 | Leibowitz ..................... 310/112 |
| 2005/0140230 A1 | * | 6/2005 | Johnson et al. ............... 310/112 |
| 2007/0029888 A1 | * | 2/2007 | Schuler et al. ................ 310/112 |
| 2008/0012441 A1 | * | 1/2008 | Yang ............................ 310/112 |
| 2010/0201217 A1 | * | 8/2010 | Dahlen ......................... 310/113 |

* cited by examiner

*Primary Examiner* — Quyen Leung
*Assistant Examiner* — John K Kim
(74) *Attorney, Agent, or Firm* — Jerry Haynes Law (57) ABSTRACT

A universal three dimensional motor generator system is provided with magnets and permanent magnetic and/or electromagnetic windings on rotors and stator for compounding and multiplying the order of voltage or potential to or from a machine. Three rotating rotors mechanically interconnected through gears and coils are strategically positioned within a housing that allows the multiple input and/or output of single and/or three phases A/C, D/C or in combination. When input power is supplied to rotor one, rotor two and rotor three start rotating along with rotor one due to gear arrangement to generate/produce power which is fed back to rotor one. This generated/produced power can/will be utilize to supplement the input power to maintain the synchronous speed across the designed load or combined to increase the output rating of machine. The system allows multiple wiring configurations allowing each section of a rotor and stator configuration to operate independently or separately as a motor or generator, or in combination.

20 Claims, 8 Drawing Sheets

THREE DIMENSIONAL MOTOR GENERATOR SYSTEM

CROSS-REFERENCE TO RELATED APPLICATIONS

This application claims the benefit of and incorporates by reference in its entirety U.S. provisional application No. 61/175,504, filed May 5, 2009 and entitled "Universal Three Dimensional Power Supply".

FIELD OF THE INVENTION

The present invention relates to a three dimensional motor generator system. More particularly, it relates to an electric motor/generator system provided with permanent magnets and/or coil windings on rotors and stator for compounding and multiplying the order of voltage/potential to or from a machine.

BACKGROUND

Electric motors/generators are commonly used to supply power to various different size electrical products and applications. One of the common problems that exist with the present-day electric motor/generator technology is the inability to meet the increasing demand of power supply. The demand of electric power has increased manifolds due to high usage of electrical equipments and new constructions. The inability of power suppliers to meet the power demands causes discomfort to the user and decreases industrial output.

Most of the electric power plant systems and national electrical power grid systems suffer from one or more deficiencies which limits their effectiveness to meet the increasing demand of power supply. One of the common problems is the need to regularly shut down power plants to replace/repair the insulation winding to avoid insulation breakdown which is very expensive and time consuming process. Industry standard often turn-up or increase the volume. This is known as the "Available Fault Current" or "Arc Fault". However, such steps have become explosive over time, which can lead to the accidental hazards or destroy equipments or can burn or kill electricians. This gave rise to higher cost of personal protective equipment and sometimes even extend the down time operation of power plants. Such systems have failed to provide adequate power to keep pace with the increasing power requirement.

Thus there is a need of a power supply system which can efficiently generate power or utilize the power from a machine for the same supply of input power.

Prior art battery technology is facing several problems to supply power to small items like laptops, PDA, toys and the like. One of the common problems with existing batteries is that they require frequent recharging to continue supplying the power. At the same time the manufacturing industry has not been able to keep an affordable pace with the demand due to high costs and small life of batteries. Batteries used in electrical vehicle propulsion systems fail to provide efficient power because of less supply of power output level and its frequent recharging problem. This has led to the increased usage of internal combustion engines in automotive industry which operate using fossil fuels and cause damage to the environment.

There is therefore a need for a power supply system to extend the normal battery life that can generate the sustained power level for a longer period of time. Further, there is a need for high power battery systems to replace the fossil fuel engines with 100% clean and eco-friendly electric vehicle propulsion system.

SUMMARY OF THE INVENTION

Accordingly, it is the prime objective of the present invention to overcome the above mentioned disadvantages of the prior art by providing a three dimensional motor generator system for compounding and multiplying the order of voltage/potential to or from a machine.

Another objective of the present invention is to provide a power supply system that extends the normal life cycle of batteries to provide the sustained power level for longer periods of time.

Another objective of the present invention is to provide a power supply system which reduces/eliminates the requirement of frequent recharging of batteries associated with laptops, PDA, toys, phones and other devices.

A further objective of the present invention is to provide a power supply system that replaces fossil fuel engine with batteries and 100% clean electric vehicle propulsion systems.

Another objective of the present invention is to replace the current power production system we have in place, including the national power grid network with new individual power supply system.

Another objective of the present invention is to provide a power supply system that generates power with minimal energy losses and required less amount of maintenance.

A further objective of the present invention is to provide a power supply system that is environmentally friendly, safe, and has decreased carbon emission.

Yet another objective of the present invention is to provide a power supply system whose scale and size can be increased or decreased depending on the application and power demand.

Embodiments of the present invention provide a universal three dimensional power supply system capable of compounding and multiplying the order of voltage or potential to or from a machine. Three rotors with permanent magnets and/or coil windings are mechanically interconnected through a gear arrangement and placed within the housing. Stator wraps around the rotors. Three rotors, stator and three coils are strategically positioned at six equidistance positions forming the hexagram points or resemble the "Star of David" configuration placed within a circular housing with one independent coil located in the exact center. The system allows multiple wiring configurations allowing each section of a rotor and stator configuration to operate independently or separately as a motor or generator, or in combination.

BRIEF DESCRIPTION OF THE DRAWINGS

The disclosure will now be made, by way of example, with reference to the accompanying drawings, in which.

DETAILED DESCRIPTION OF THE INVENTION

Embodiments of the present invention provide a three dimensional motor generator system for compounding and multiplying the order of voltage/potential to or from a machine employing the permanent magnets and/or coil windings (hereafter referred as: windings) on rotors and stator. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Embodiments of the present invention provide a universal three dimensional motor generator system with permanent magnets and/or coil windings on rotors and stator for compounding and multiplying the order of voltage or potential to or from a machine. Three rotating rotors are mechanically interconnected through a gear arrangement and four coils are strategically positioned within a housing allowing the multiple input and/or output of single and/or three phases A/C, D/C or in combination. Stator wraps around the rotors. The three rotors, stator and three coils are strategically positioned at six equidistant positions resembling the hexagram points or "Star of David" configuration placed within a circular housing with one independent coil located in the exact center. The system allows multiple wiring configurations allowing each section of a rotor and stator configuration to operate independently as a motor or generator, or in combination. When input power is supplied to rotor one, rotor two and rotor three simultaneously start rotating with rotor one due to gear arrangement, to generate/produce power. This generated/produced power will be utilized to supplement the input power of rotor one to maintain the synchronous speed across the designed load or combined to increase the output rating of machine.

Figure 1:
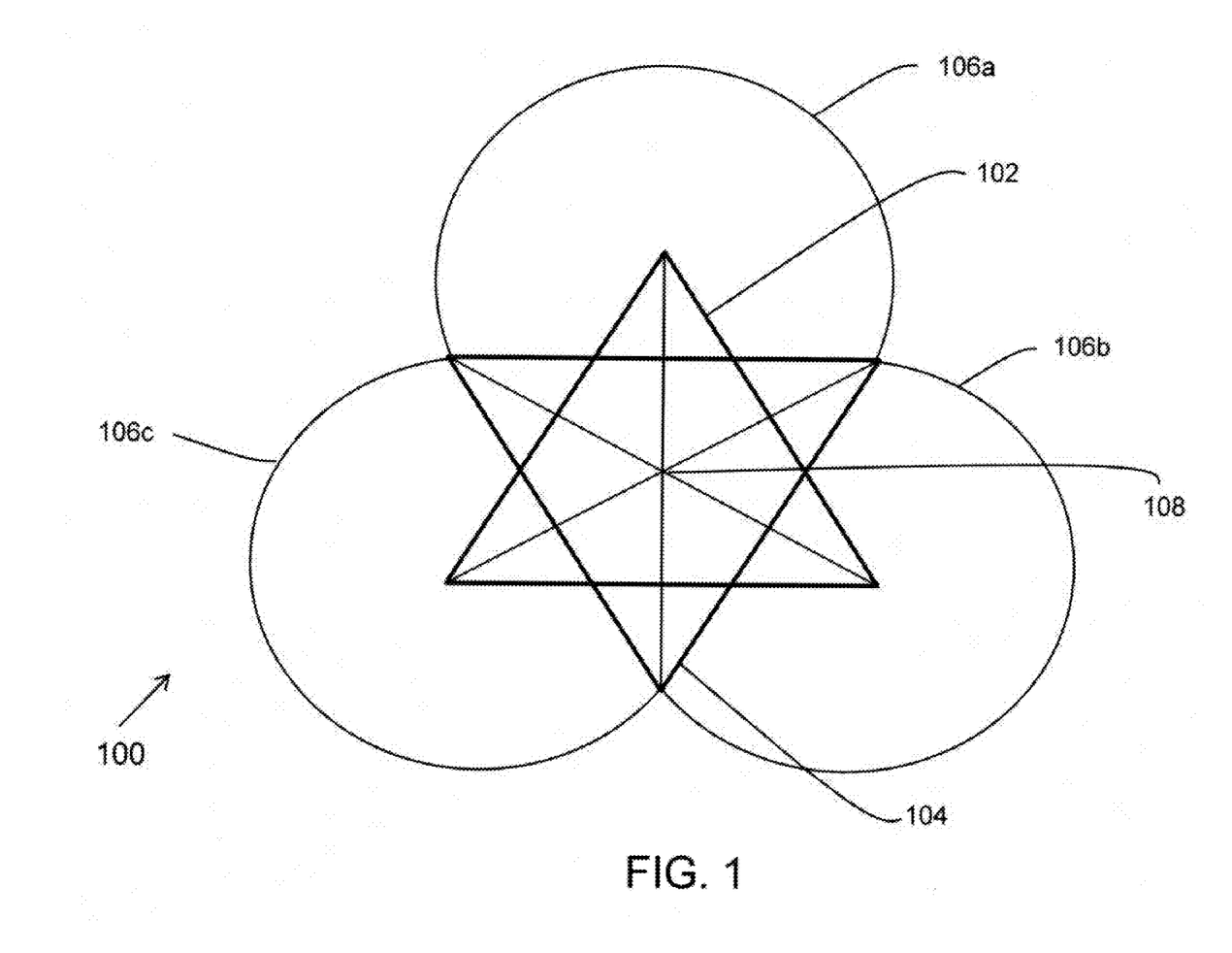
FIG. 1 is an illustrative view showing the arrangement of rotor, stator and coils of the power supply system, in accordance with an embodiment of the present invention.

Referring now to FIG. 1, I present an illustrative view showing the components arrangement 100 for rotors, stator and coils of the power supply system, in accordance with an embodiment of the present invention.

Component arrangement 100 is an arrangement of rotors, stator and coils displaying the position of rotors, stator and coils within the power supply system. Arrangement 100 includes two similar equilateral triangles, one pointing up 102, other pointing down 104, three partial circles 106a, 106b and 106c and dead center 108.

Equilateral triangle 102 and equilateral triangle 104 are similar in size and arranged in a manner that points of one equilateral triangle are exactly opposite to the points of another equilateral triangle. In an embodiment of the present invention, the two equilateral triangles are arranged in a "Star of David" configuration. In another embodiment of the present invention, the equilateral triangles are arranged in a hexagram configuration. Three points of equilateral triangle 102 present the position of the three rotors. Three points of equilateral triangle 104 present the position of the three coils. Dead center 108 of two equilateral triangles 102 and 104 represents the exact center and presents the position of the fourth independent coil. Three partial circles 106a, 106b and 106c establish the outer confines of the stator based on the rotors. The size and scale of power supply system can be increased or decreased depending on the application and the power demand.

Figure 2:
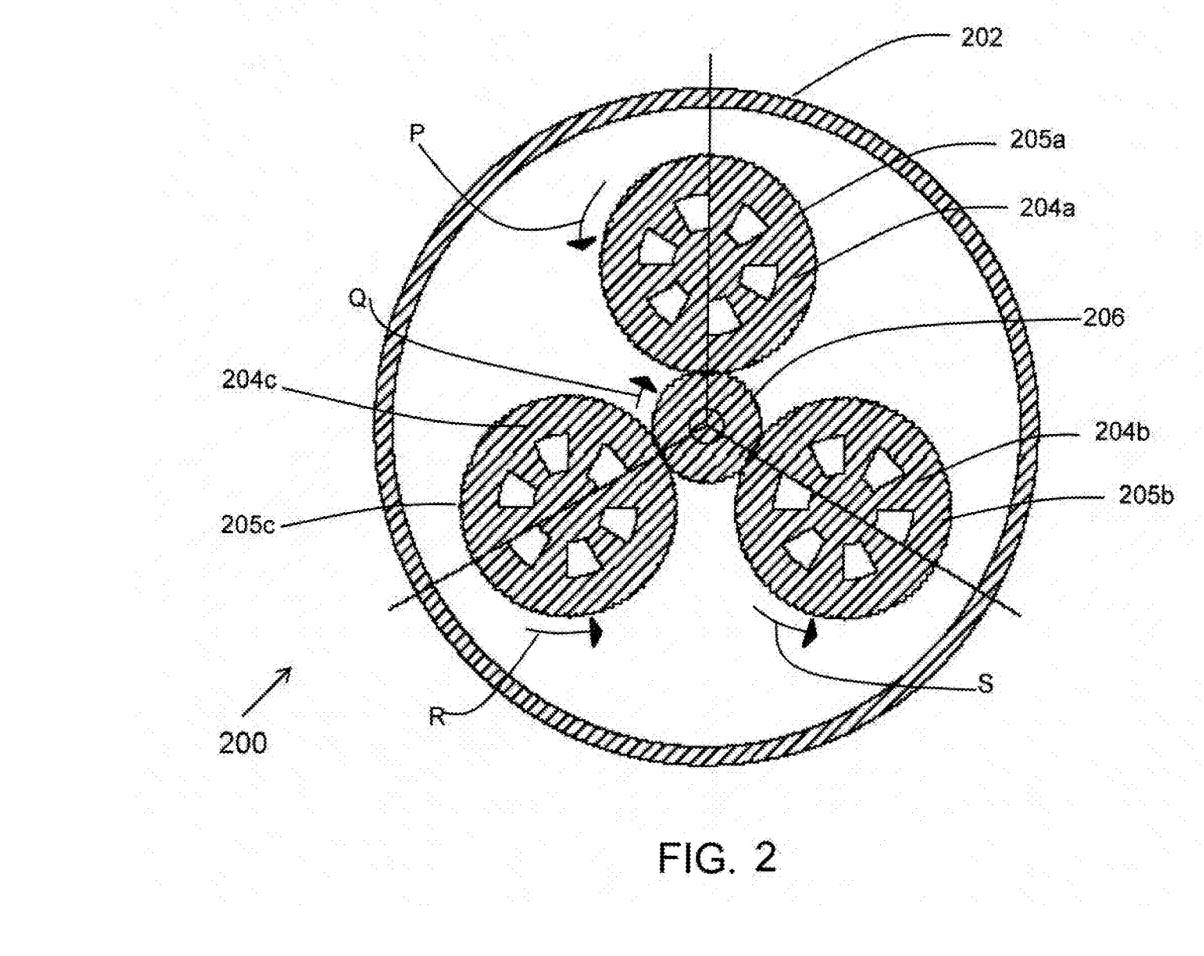
FIG. 2 is a perspective view showing the planetary gear arrangement of rotors with rotors gears of the power supply system, in accordance with an embodiment of the present invention.

FIG. 2 is a perspective view showing the planetary gear arrangement that includes motor/generator housing 202, three rotors 204a, 204b, and 204c with rotor gears 205a, 205b, and 205c and central gear 206.

Housing 202 forms the casing of the electric motor/generator system within which the three rotors are placed. Three rotors 204a, 204b, and 204c are rotating armatures of the power supply system. Windings of rotors 204a, 204b and 204c are formed of permanent magnets and/or coil windings. Three rotors 204a, 204b, and 204c have teeth around their circumference to form base of rotor gears 205a, 205b, and 205c to engage with central gear 206 to transfer mechanical power of one rotor to other rotor. In a preferred embodiment of the present invention, the arrangement of three rotors and the central gear resembles the planetary gear arrangement. In an embodiment of the present invention, the three rotors have rotor gears 205a, 205b, and 205c which engage with central gear 206 and enable rotation of three rotors 204a, 204b, and 204c to rotate through the gear arrangement. The size and type of the rotors can be varied based on the requirement of power and the application When input power is provided to rotor 204a, the three rotors move with synchronised rotation in the same direction by means of central gear 206. The diameter or size of the central gear is a relationship between torque, speed or frequency. In an embodiment of the present invention, gears can be replaced with any means possible to achieve the same results.

The arrows P, Q, R, and S show the direction of the motion of rotors 204a, 204b, and 204c and central gear 206. In an embodiment of the present invention, the direction is anti-clockwise. In another embodiment of the present invention, the direction is clockwise.

Figure 3:
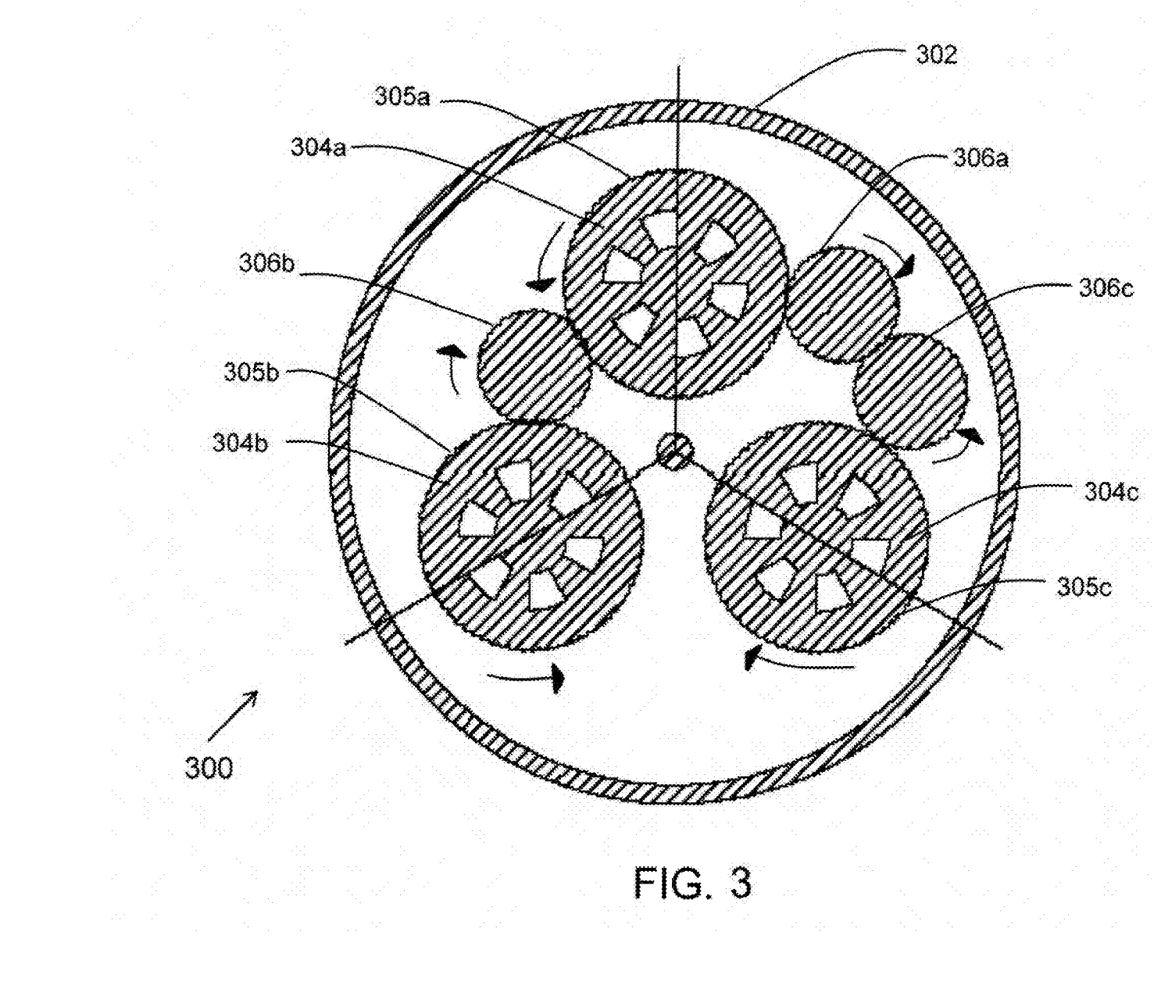
FIG. 3 is a perspective view showing the spur gear arrangement of rotors with rotors gears of the power supply system, in accordance with an embodiment of the present invention.

FIG. 3 is a perspective view showing the spur gear arrangement 300 that includes motor/generator housing 302, three rotors 304a, 304b, and 304c with rotor gears 305a, 305b, and 305c, and spur gears 306a, 306b, and 306c. Three rotors 304a, 304b, and 304c have teeth around their circumference to form a base of rotor gears 305a, 305b, and 305c to engage with spur gears 306a, 306b, and 306c to transfer mechanical power of one rotor to other rotor. In an embodiment of the present invention, the three rotors have rotor gears 305a, 305b, and 305c which engage with spur gears 306a, 306b, and 306c to enable rotation of the three rotors 304a, 304b, and 304c through the gear arrangement. In an embodiment of the present invention, input power is provided to rotor 304a of the power supply system. Mechanical power of rotor 304a is transferred to rotor 304b and 304c by means of spur gear 306a, 306b and 306c. When input power is provided to rotor 304a, mechanical power of rotor 304a is transferred to rotor 304b and 304c by means of spur gears 306a, 306b and 306c. Spur gear 306b rotates rotors 304a and 304b in the same direction and spur gears 306a and 306c cause rotor 304c in the opposite direction. The diameter or size of the spur gears is a relationship between torque, speed or frequency. In an embodiment of the present invention, gears can be replaced with any means possible to achieve the same results.

Figure 4:
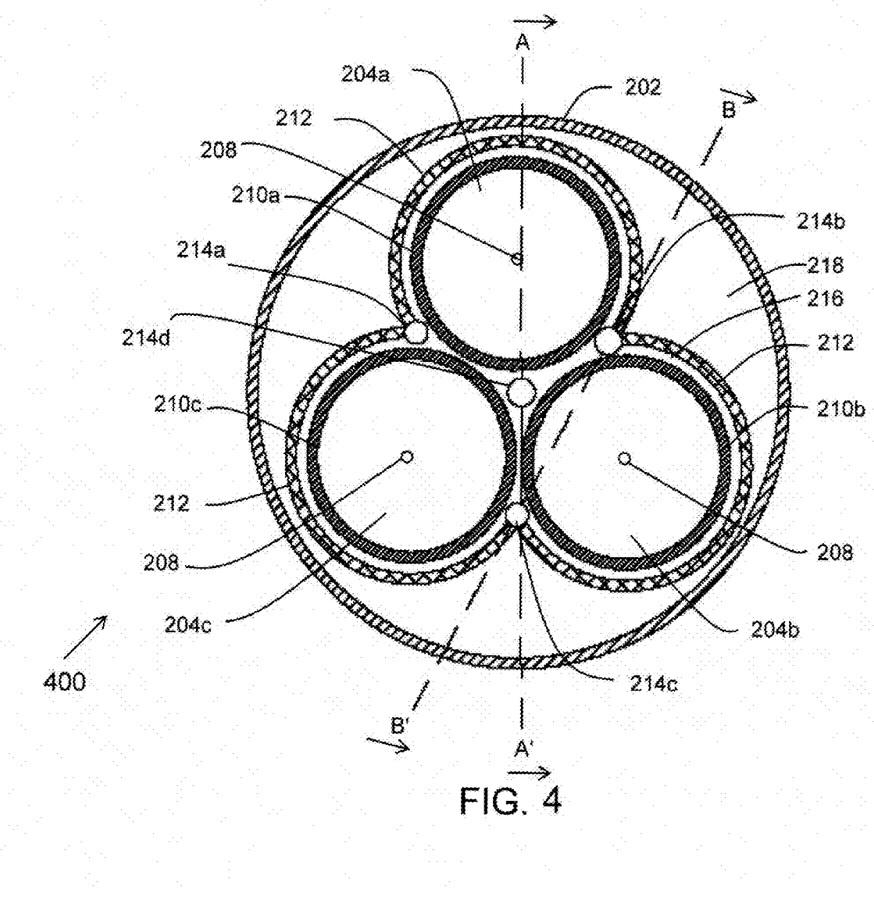
FIG. 4 is a cut away view of FIG. 2 and FIG. 3 showing the arrangement of rotors, stator, and coils of the power supply system, in accordance with an embodiment of the present invention.

Referring now to FIG. 4, I present cut away view of FIG. 2 and FIG. 3 showing the arrangement 400 that includes motor/generator housing 202, three rotors 204a, 204b, and 204c, axle shafts 208, rotor windings 210a, 210b, and 210c, stator 212, coils 214a, 214b, 214c and 214d, gap 216 and space 218.

Three rotors 210a, 210b, and 210c windings are preferably permanent magnets and coil windings. Coil windings are loops of wire wrapped around a core and are composed of conducting material. Examples of conducting material include but are not limited to copper, aluminum, and iron. In an embodiment of the present invention, support is rendered to rotors by means of mechanical bearings of magnetic levitation. Each one of three rotors 204a, 204b, and 204c, rotates on its independent axle shaft 208.

The stator is the stationary part of the rotor system. In an embodiment of the present invention, stator 212 is preferably permanent magnets and coil windings. The stator wraps around the rotors forming three partial interconnected circles beginning from one coil 214a to other coil 214b, 214b to 214c and 214c to 214a respectively. Gap 216 represents the small air gap between rotor windings 210a, 210b, and 210c, and stator 212. Gap 216 permits unobstructed rotation of the rotors and maximum generation of electrical potential. Three coils 214a, 214b, and 214c are placed at the junctions of the three interconnected circles of the stator. Coil 214d is placed in the exact center.

Space 218 is the empty space between the electric motor/generator system and the housing 202. Space 218 allows cooling and provides a place for electrical aggregates. In an embodiment of the present invention, electrical aggregates include alternating current (A/C) and direct current (D/C) wiring systems, voltages, amperages and wattages, or a combination of A/C and D/C.

In an embodiment of the present invention, input power is provided to one or more of the rotors of the power supply system. Based on the type of input power received, the rotor can function as an electric motor or a generator. In an embodiment of the present invention, the system will function as an electric motor when the input power received is electrical energy. In another embodiment of the present invention, the system will function as a generator when the input power received is mechanical energy. The electric motor/generator system is organized into three individual sections, each section comprises a rotor and a stator configuration. Each section may operate independently as a motor, generator or in combination, depending on the type of input power received and the requirement of application. All three sections may be the same type, or in any combination of six. Motor/Generator, A/C, D/C or Permanent Magnet. Any configuration or quantity of the six, form the complete system. The power supply system of the present invention allows multiple wiring configurations permitting each section of a rotor and stator configuration to operate independently or separately as a motor or generator, or in combination.

In an embodiment of the present invention, input power is provided to rotor 204a. Rotor 204a starts rotating on its independent axle shaft 208 and functions as a starter to bring the electric motor/generator system up to a synchronous speed. The rotation of rotor 204a causes rotation of rotors 204b and 204c which are mechanically interconnected through the arrangement of gears. Rotors 204b and 204c receive mechanical input from rotor 204a and start functioning as generators. The voltage induced in rotors 204b and 204c generates electrical induction in between stator 212 and windings 210b and 210c of the rotors. Power is produced from rotors 204b and 204c through the interaction of the rotors and the stator. This generated/produced power can/will be utilize to supplement the input power of rotor 204a to maintain the synchronous speed across the designed load or combined to increase the output rating of machine. This multiplies the order of voltage/potential generated and enables the power supply system of the present invention to meet the increasing demands of power.

Rotors 204a, 204b, and 204c further induce voltage into the coils 214a, 214b, 214c and 214d. Voltage from the coils is utilized as a motor control for one or more machines, to buck or boost the potential input or output of the machines. In an embodiment of the present invention, the voltage generated by rotors 204b and 204c is fed back to rotor 204a to maintain rotation and synchronous speed across the designed load and to supplement the incoming input power for the electric motor/generator system to operate, thereby reducing the input power required. In an embodiment of the present invention, voltage generated by rotors 204b and 204c is combined to directly supply power to the load to increase the output rating of electric motor/generator system. This enables the reduced cost of operation and maintains a sustained power level for the electric motor/generator system to work for longer periods, eliminating the frequent recharging problem of batteries.

Wiring from the three rotors, stator, and four independent coils is installed within the housing in space 218. Wiring is brought out of the power supply system through the housing into an industry standard junction box/terminal box for wire splicing or termination. Details corresponding to wiring have been provided in conjunction with FIG. 7.

In an application of the present invention, the power supply system of the present invention is utilized as a generator for electric vehicle propulsion systems. Generator power is provided by means of a battery array to rotor 204a. Rotor 204a starts rotating on its axle shaft 208. The rotation of rotor 204a causes rotation of rotors 204b and 204c which are mechanically interconnected through the arrangement of gears. Rotors 204b and 204c start rotating and function as generators to produce power for the electric vehicle propulsion systems. In the case of a no-load condition, power from rotors 204b and 204c is fed back to rotor 204a to maintain rotation for synchronous operation, to supply power to accessories and/or to re-charge the battery array. This application of the present invention would replace internal combustion engines, and thus is environment friendly and would yield minimal carbon emission.

In another application of the present invention, the power supply system of the present invention is utilized as a generator for uninterruptible power supply (UPS). Input power is supplied to a battery array. Generator power is provided by means of a battery array to rotor 204a. Rotor 204a starts rotating on its axle shaft 208. The rotation of rotor 204a causes rotation of rotors 204b and 204c which are mechanically interconnected through the arrangement of gears. Rotors 204b and 204c start rotating and function as generators to produce power. Power generated from rotor 204b is utilized to supplement the input power of rotor 204a, or utilize to run across the load/machine. When utility power fails, power generated from rotor 204b is 100% utilized to charge battery array to maximize battery array output life to the inverter allowing the UPS system to operate for extended periods of time.

In an alternative motor embodiment, all three rotors 204a, 204b, and 204c function as motors to generate motive force in a smaller package or assembly.

In an alternative generator embodiment, all three rotors 204a, 204b, and 204c function as generators to generate maximum output in a smaller package or assembly.

Figure 5:
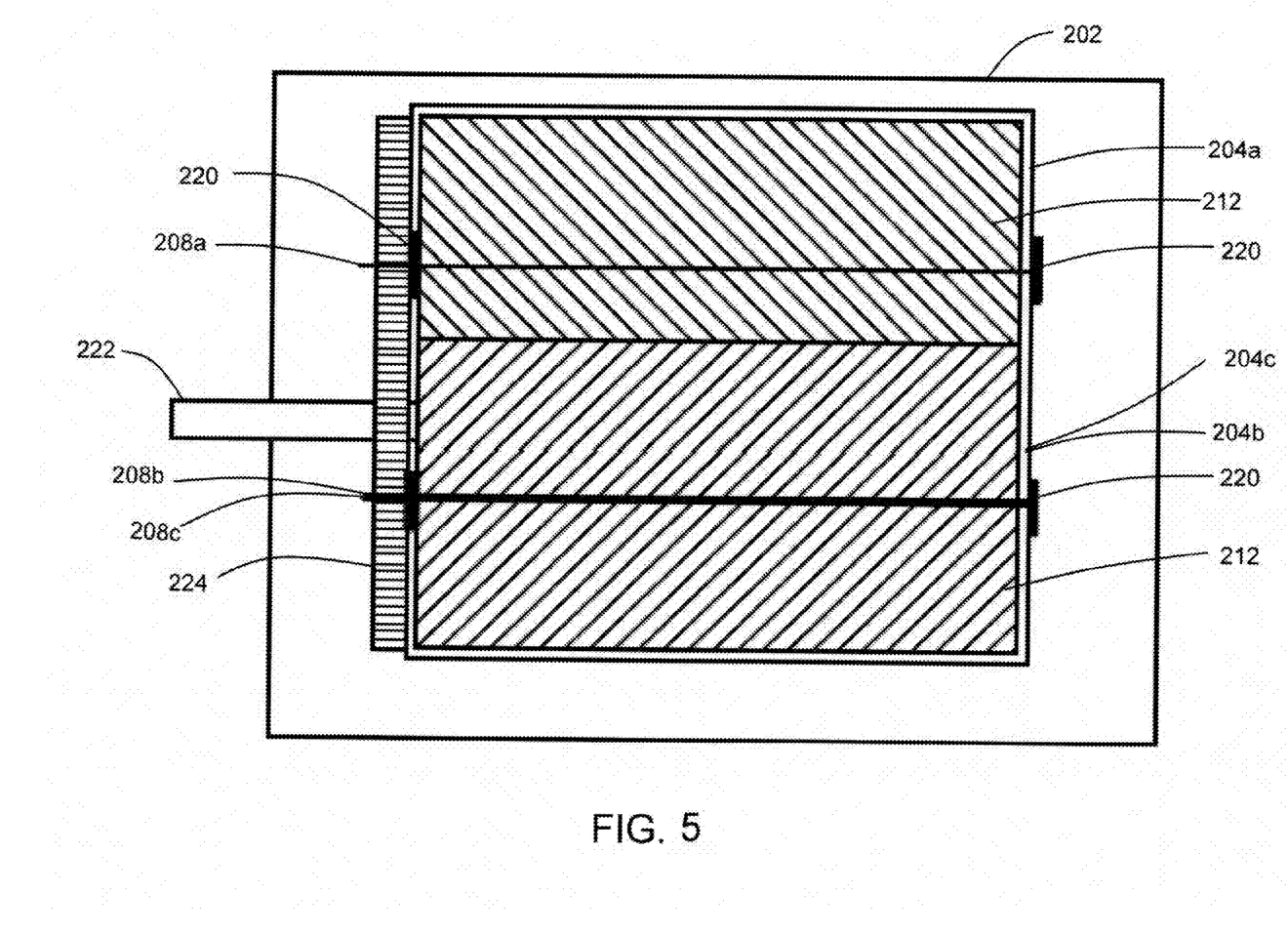
FIG. 5 is cross-sectional view of FIG. 4 taken along line A-A', showing with rotor gears on axle shafts and stator, in accordance with an embodiment of the present invention.

FIG. 5 is cross-sectional view of FIG. 4 taken along line A-A', showing arrangement 500 that includes housing 202, three rotors 204a, 204b, and 204c with rotor gears 205, axle shafts 208 with rotor axle bearings 220, stator 212 and motor shaft with bearings 222 (when used).

Each one of the three rotors 204a, 204b, and 204c is installed on independent axle shafts 208a, 208b, and 208c with bearings 220 at both the ends of rotor axle. Rotor shafts 208a, 208b, and 208c are used to support rotors on bearings 220. Motor shaft 222 is positioned in the center of three rotors 204a, 204b and 204c and is used to provide the mechanical power to or from rotors.

Figure 6:
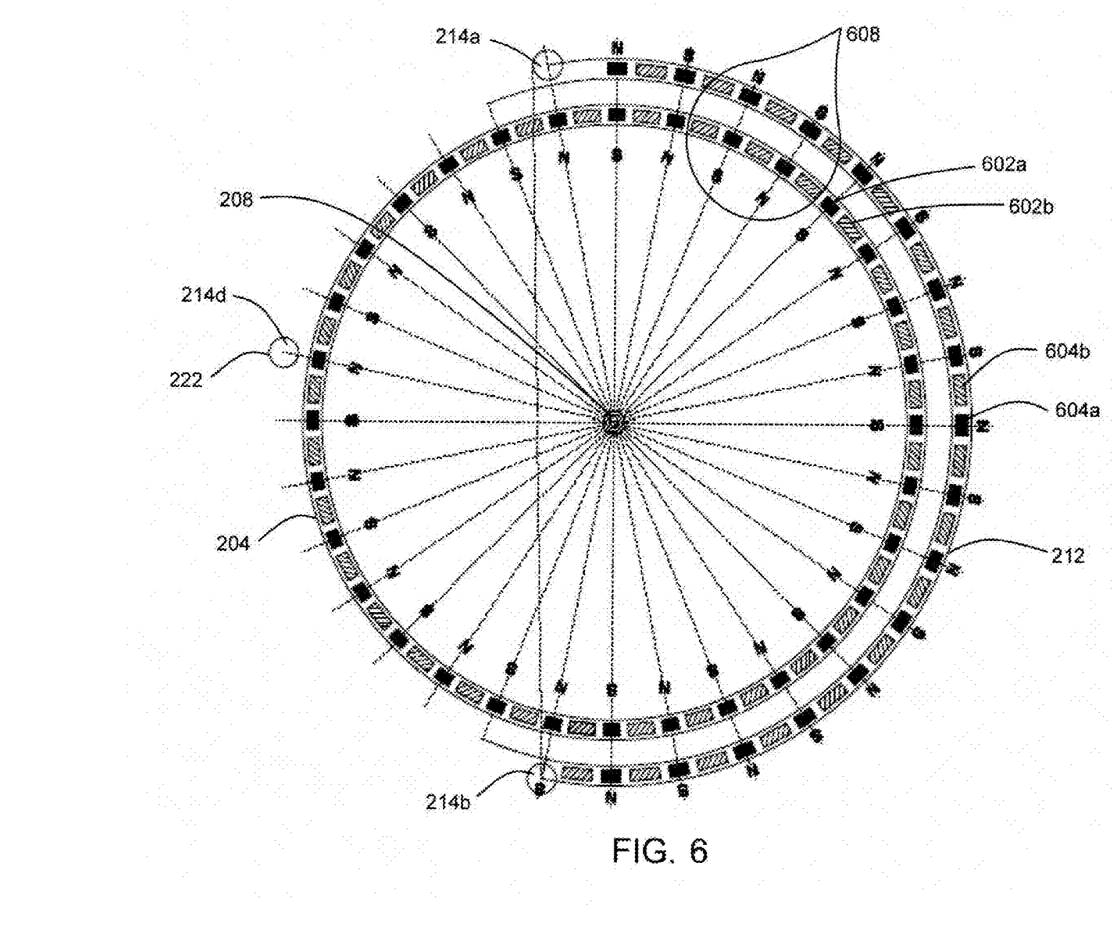
FIG. 6 is a close-up magnified view of rotor and stator of the power supply system, taken along line B-B' of FIG. 4, showing the permanent magnets and coil winding of rotor and stator, in accordance with an embodiment of the present invention.

FIG. 6 is a close-up magnified view of the rotor and stator of the power supply system, taken along line B-B' of FIG. 4, showing the permanent magnets and coil windings of rotor and stator, in accordance with an embodiment of the present invention.

The three rotors and the stator are designed of permanent magnets and coil windings. Stator 212 wraps over the rotor, three-fourths of the way around forming the partial circle from coil 214a to 214b. Magnets 602a of the rotor and magnets 604a of the stator are arranged in an alternating pattern 608, in north-south to north-south and south-north to south-north alignment. Coil windings 602b of rotor 204 are installed in slots enclosed between two consecutive magnets 602a of the rotors. Coil windings 604b of stator 212 are installed in slots enclosed between two consecutive magnets 604a of the stator.

The rotors are capable of rotating in clockwise or counter clockwise direction. When input power is provided, the rotor rotates on its axle shaft 208. Motor shaft 222 rotates because of the bearings and gear arrangement 214d. Motor shaft 222 mounted on bearings pass through coil 214d.

Figure 7:
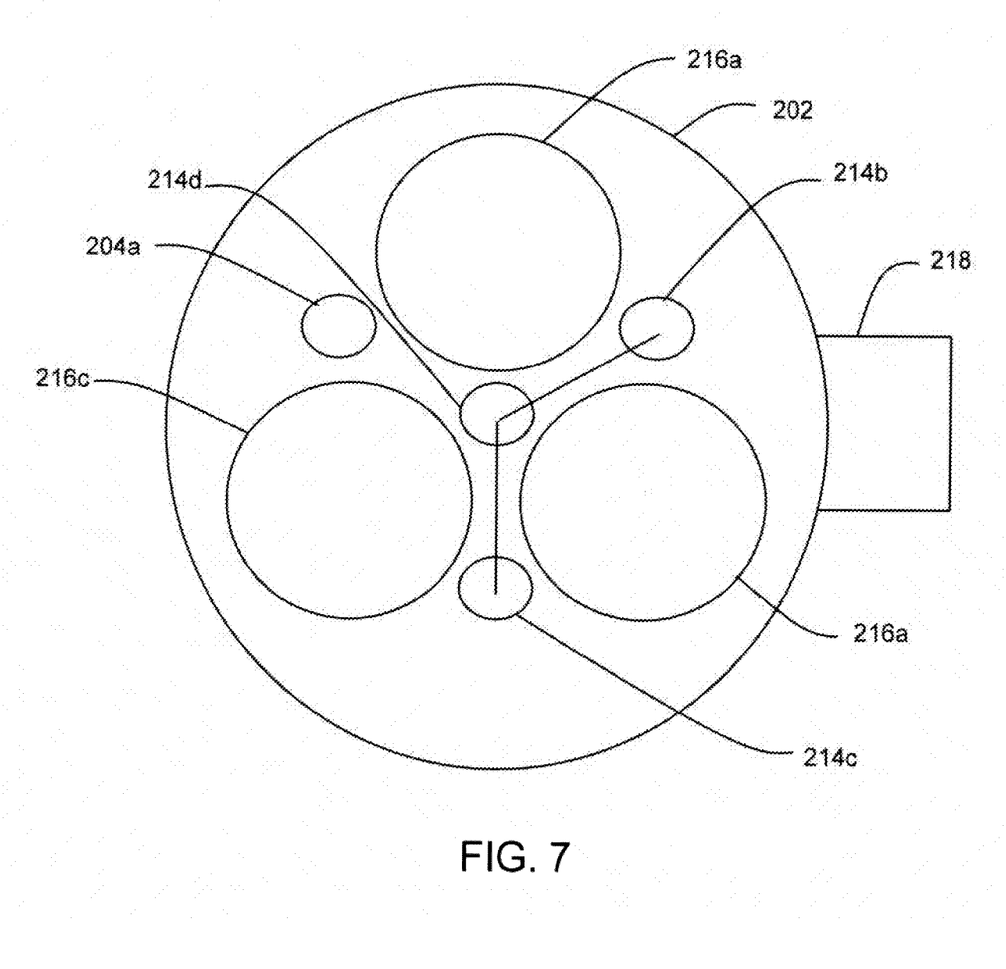
FIG. 7 is an illustrative view showing wiring plan of the power supply system to provide input power or take output power, in accordance with an embodiment of the present invention.

FIG. 7 is an illustrative view showing a wiring plan of the power supply system to provide input power or take output power, in accordance with an embodiment of the present invention. Wiring is required to provide input power and to receive out output power from the electric motor/generator system. Wiring from the three rotors, stator and coil is installed within the housing in space 218. Wiring is brought out of the power supply system through the housing into an industry standard junction box/terminal box for wire splicing or termination. The electric motor/generator system allows multiple wiring configurations allowing each section of rotor and stator configuration to operate independently or separately as a motor or generator, or in combination For purposes of this invention, the wiring design characteristics will be adopted and/or modified from current National Electrical Manufacturing Association (NEMA) standards pertaining to electric motors and electric generators. Examples of design characteristics include, but are not limited to, Series D/C motor, Shunt D/C Motor, Compound D/C Motor, Grammering Armature, Drum-wound Armature, Compensating windings and Interpoles, Series A/C Motor, Synchronous A/C Motor, Split phase, Shaded Pole, Induction A/C Motors, Squirrel Cage A/C Motor, Squirrel Cage Windings, Salient Pole Windings, Single and Three Phase applications.

Figure 8:
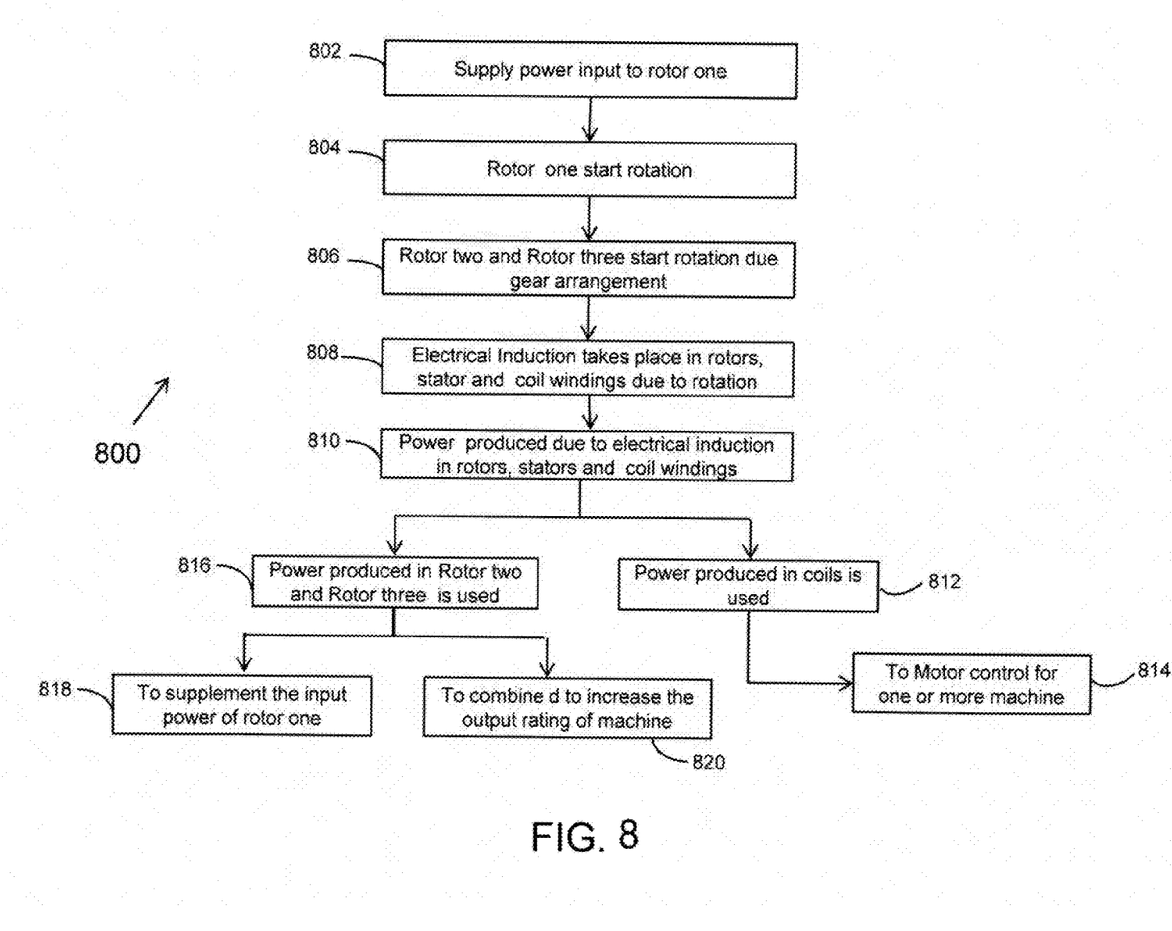
FIG. 8 is a block diagram depicting the working of electric motor/generator system of the power supply system, in accordance with an embodiment of the present invention.

Referring now to FIG. 8, I present a block diagram 800 depicting the working of electric motor/generator system of the power supply system, in accordance with an embodiment of the present invention. At step 802, input power is provided to one of the three rotors, rotor one. Rotor one is capable of operating independently as a motor, generator, or in combination, depending on the type of input received. In an embodiment of the present invention, when the input is electrical energy, the system works as an electric motor. In another embodiment of the present invention, when the input received is mechanical energy, the system works as a generator.

At step 804, rotor one starts rotating based on the input power received. Windings of rotor one is formed of magnets and coil windings. Rotor one starts rotating on its independent axle shaft and functions as a starter to bring the electric motor/generator system up to the synchronous speed. At step 806 rotor two and rotor three starts rotating due to gear arrangement. At step 808 electrical inductions takes place between rotors, stator and coil windings due to rotation.

At step 810, power is produced because of the electrical induction in the three rotors, stators and the coil. Power produced from the coils at step 812 is utilized as a motor control for one or more devices/machines at step 814, to buck or boost the potential input or output of the machines.

Power produced in rotor two and rotor three at step 816 is fed back to rotor one at step 818 to maintain synchronous speed across the designed load. Thus, it supplements the incoming input power of rotor one to operate, thereby reducing the input power required. At step 820 power produced by rotor two and rotor three is combined to increase the output rating of machine. This enables the reduced cost of operation and maintains a sustained power level for the electric motor/generator system to work for longer periods.

The power supply system provided with magnets and permanent magnetic and/or electromagnetic windings described in the invention fulfil the objects set forth at the beginning of the description and provide means whereby power supply system compounds and multiplies the order of voltage or potential to or from a machine allowing multiple input and/or output of single and/or three phases A/C, D/C or in combination.

While the illustrative embodiments of the disclosure have been described above, it will be recognized and understood that various modifications can be made in the disclosure and the appended claims are intended to cover all such modifications which may fall within the spirit and scope of the disclosure.

I claim:

1. A three dimensional motor generator system including permanent magnets or coil windings on rotors and stator for compounding and multiplying the order of voltage or potential to or from a machine, the system comprising:
   a. at least three rotors interconnected through a gear arrangement wherein the center of each rotor is positioned at the points of an equilateral triangle pointing up;
   b. at least four independent coils wherein three independent coils are positioned at the points of an equilateral triangle pointing down and interlocking with the equilateral triangle pointing up wherein the fourth coil is positioned at the center of the two equilateral triangles;

c. a stator wrapping around the rotors wherein the stator forms three interconnected partial circles beginning from one coil to the other coil;
d. at least a motor housing means to provide a space for cooling the power supply system and placing electrical aggregates; and
e. at least a terminal box attached comprising a motor housing to provide multiple inputs or outputs of power.

2. The three dimensional motor generator system of claim 1, wherein the permanent magnets and coil windings are adjacent to each other.

3. The three dimensional motor generator system of claim 1, wherein the permanent magnets of the rotor and stator are positioned in an alternating pattern.

4. The three dimensional motor generator system of claim 1, wherein the coil winding of the rotor and stator are installed in slots enclosed between two consecutive magnets.

5. The three dimensional motor generator system of claim 1 wherein different gear arrangements are provided to transfer power from one rotor to the other rotor.

6. The three dimensional motor generator system of claim 1, wherein the gear arrangement is a planetary gear arrangement in which all the three rotors rotate in the same direction.

7. The three dimensional motor generator system of claim 1, wherein the gear arrangement is a spur gear arrangement in which two rotors rotate in the same direction and the third rotor rotates in the opposite direction.

8. The three dimensional motor generator system of claim 1, wherein the diameter and size of gear(s) depends on a relationship between speed, torque, and frequency.

9. The three dimensional motor generator system of claim 1, wherein the system is organized into three sections, each section comprises a rotor and stator configuration.

10. The three dimensional motor generator system of claim 9, wherein each section can operate independently or separately as a motor or a generator or in combination.

11. The three dimensional motor generator system of claim 1, wherein the system functions as a motor when AC or DC voltage is supplied to the rotor.

12. The three dimensional motor generator system of claim 11, wherein the AC or DC voltage supply to the rotor is through sliding contacts.

13. A three dimensional power supply system as in claim 1, wherein the system will function as a generator when mechanical power is supplied to the rotor.

14. The three dimensional motor generator system of claim 1 wherein the two interlocking equilateral triangles with rotors and coils are configured as a "Star of David" configuration.

15. The three dimensional motor generator system of claim 1, wherein the two interlocking equilateral triangles with rotors and coils are configured as a "Star of David" configuration.

16. A method for three dimensional power supply for compounding and multiplying the order of voltage or potential to or from a machine, the method comprising:
a. positioning three rotors at the points of an equilateral triangle pointing up wherein the three rotors are interconnected through a gear arrangement;
b. positioning three independent coils at the opposite points of an equilateral triangle pointing down which is interlocking with first equilateral triangle and fourth coil at the center of the two equilateral triangles;
c. wrapping a stator around the rotors wherein the stator forms three interconnected circles beginning from one coil to the other coil;
d. providing permanent magnets or coil windings on three rotors and stator;
e. providing a motor housing means to provide a space for cooling and placing electrical aggregates; and
f. providing a terminal box attached with motor housing means for multiple inputs and/or outputs of power.

17. The method of claim 16, wherein the permanent magnets and coil windings are adjacent to each other.

18. The method of claim 16, wherein the permanent magnets of rotor and stator are installed and arranged in an alternating pattern.

19. The method of claim 16, wherein different gear arrangements can be configured to transfer power from one rotor to the other rotor.

20. The method of claim 16, wherein the two interlocking equilateral triangle with rotors and coils are configured as the "Star of David" configuration.

* * * * *